US006436544B1

(12) United States Patent
Veyrat et al.

(10) Patent No.: US 6,436,544 B1
(45) Date of Patent: Aug. 20, 2002

(54) COMPOSITE METAL-COATED POLYESTER FILMS WITH BARRIER PROPERTIES

(75) Inventors: Didier Veyrat, Saint-Cyr-au-Mont-d'Or; Eric Maitre, Marcy l'Etoile, both of (FR)

(73) Assignee: Toray Plastics Europe S.A. (FR)

( * ) Notice: Subject to any disclaimer, the term of this patent is extended or adjusted under 35 U.S.C. 154(b) by 0 days.

(21) Appl. No.: 09/446,083

(22) PCT Filed: Jul. 14, 1998

(86) PCT No.: PCT/JP98/04380

§ 371 (c)(1),
(2), (4) Date: Mar. 16, 2000

(87) PCT Pub. No.: WO99/03918

PCT Pub. Date: Jan. 28, 1999

(30) Foreign Application Priority Data

Jul. 17, 1997 (FR) ........................................ 97 09315

(51) Int. Cl.$^7$ ........................... B32B 15/08; B05D 7/02

(52) U.S. Cl. ...................... 428/458; 428/215; 428/480; 428/910; 427/404; 427/407.1; 427/412.5

(58) Field of Search ................................ 428/458, 213, 428/215, 480, 910; 427/412.5, 404, 407.1

(56) References Cited

U.S. PATENT DOCUMENTS

| | | | | | |
|---|---|---|---|---|---|
| 4,568,600 | A | * | 2/1986 | Ono et al. | 428/145 |
| 4,824,725 | A | * | 4/1989 | Thoese | 428/336 |
| 4,880,700 | A | * | 11/1989 | Charmot et al. | 428/337 |
| 5,128,206 | A | * | 7/1992 | Fiard et al. | 428/337 |
| 5,164,248 | A | * | 11/1992 | Fleury et al. | 428/220 |
| 5,540,974 | A | * | 7/1996 | Hoseki et al. | 428/141 |
| 5,658,676 | A | * | 8/1997 | Prissette et al. | 428/483 |
| 6,165,602 | A | * | 12/2000 | Fujita | 428/216 |

* cited by examiner

*Primary Examiner*—Paul Thibodeau
*Assistant Examiner*—Monique R Jackson
(74) *Attorney, Agent, or Firm*—Harness, Dickey & Pierce, P.L.C.

(57) ABSTRACT

The invention concerns composite metallized polyester films with good barrier properties relative to gases. More precisely, it concerns a biaxially drawn composite metallized film based on polyester and having improved barrier properties to gases, characterized in that the composite comprises a polyester film base of 5 $\mu$m to 50 $\mu$m, directly coated on one of its two faces with a layer including a mixture of a polyvinyl alcohol which has an average degree of polymerization in number equal to or in excess of 350 and a water-dispersible copolyester with sulphonyloxy residues, the layer including the polyvinyl alcohol and the water-dispersible copolyester being in turn coated with a metal layer, the composite film exhibiting a permeability to oxygen, measured at 23° C. under 50% relative humidity, equal to or lesser than 0.4 $cm^3/m^2/24$ h. The composite metallized polyester films have, besides their barrier properties, excellent resistance to mechanical stresses, such as in particular crumpling.

37 Claims, No Drawings

COMPOSITE METAL-COATED POLYESTER FILMS WITH BARRIER PROPERTIES

The present invention is concerned with metallized composite films based on polyester and having good barrier properties against gases.

Polyester films, in particular polyethylene terephthalate, are largely used for packaging, owing to their numerous advantages, such as their mechanical properties, their transparency, their lack of toxicity, and because they have no taste or odour.

However, their properties as barriers for gases can limit their use in applications requiring a high level of protection for the packaged items, against the action of outside gases, in particular against the action of the oxygen of air, or conversely, can not maintain a constant gas composition within the packaging.

In order to overcome this drawback, it was proposed in the GB patent 1 126 952 to deposit on a polymer film a solution of a polyvinyl alcohol, in order to create a layer of polyvinyl alcohol, the latter having good gas-barrier properties. In order to enable a good adhesion of the polyvinyl alcohol layer on films of acetate cellulose, polycarbonate or polyethylene terephthalate, an intermediate layer of a polyurethane adhesive is provided between the film base and the polyvinyl alcohol layer.

Patent EP-A-0 254 468 also describes a composite film comprising a film base of a synthetic thermoplastic polymer, such as a polyamide, a polyethylene, a polypropylene or a polyester, having two coatings on the same face of the film base; the first coating being adjacent to the film base and being comprised of a urethane primer applied in a solvent, which enables, when dry, a dispersion in an aqueous solution of a polyvinyl alcohol to wet the primer coating, the second coating being placed on the dried surface of the first coating and including a material based on a polyvinyl alcohol acting as a barrier to gases.

The present invention is concerned with metallized polyester films having good barrier properties to gases, owing to a coating including a polyvinyl alcohol placed directly on the surface of the polyester film without the presence of an intermediate adhesive layer, while providing good adhesion properties between the polyester film base and the coating.

More precisely, it is concerned with a metallized composite film stretched biaxially, based on a polyester and having improved barrier properties to gases, characterised in that it includes a polyester film base of 5 $\mu$m to 50 $\mu$m, coated on one of its two faces with a layer including a polyvinyl alcohol which has an average degree of polymerization in number equal to or in excess of 350 and a water-dispersible copolyester with sulphonyloxy residues, the layer including the polyvinyl alcohol and the water-dispersible copolyester being in turn coated with a metal layer, said composite film exhibiting a permeability to oxygen measured at 23° C. under a relative humidity of 50%, equal to or lesser than 0.4 $cm^3/m^2/24$ h.

The polyester forming the film base can be selected from those polyesters which are normally used for obtaining semi-crystalline bi-oriented films. These are film-forming linear polyesters, which crystallise when oriented and which are obtained in the usual manner from one or several aromatic dicarboxylic acids or their derivatives (for example, esters of lower aliphatic alcohols or halogenides) and from one or several aliphatic glycols. As examples of aromatic acids, one can mention phthalic acid, terephthalic acid, isophthalic acid, naphthalene 2,5-dicarboxylic acid and naphthalene 2,6-dicarboxylic acid. These acids can be associated to a minor amount of one or several aliphatic or cycloaliphatic dicarboxylic acids, such as adipic acid, azelaic acid and hexahydroterephthalic acid. As non limiting examples of aliphatic diols, one can mention ethylene glycol, 1,3-propanediol and 1,4-butanediol. These diols can be associated with a minor amount of one or several aliphatic diols with a higher carbon content (neopentylglycol for example) or cycloaliphatic diols (cyclohexanedimethanol). Preferably, the film-forming crystallisable polyesters are polyterephthalates or polynaphthalene dicarboxylates of alkylene diols and, in particular polyterephthalate of ethylene glycol (PET), of 1,4-butanediol or copolyesters including at least 80% in moles ethylene glycol terephthalate residues. Advantageously, the polyester is a polyterephthalate of ethylene glycol having an intrinsic viscosity measured at 25° C. in ortho-chlorophenol comprised between 0.6 and 0.75 dl/g.

The polyester forming the film base must be selected in such a manner that its temperature at the beginning of the melting be higher than the temperature at which the bi-stretched film comprising the layer of the polyvinyl alcohol and of the water-dispersible copolyester is heated during its preparation.

When the thickness of the film including the polyvinyl alcohol and a water-soluble copolyester with sulphonyloxy residues is lesser than 0.6 $\mu$m, the average roughness Rz of the film base (such as defined in standard DIN 4768) is lesser than or equal to 0.40 $\mu$m on the face of the film carrying the layer of the polyvinyl alcohol and of the water-dispersible copolyester and this face exhibits, on the average, not more than 20 peaks having a height equal to or in excess of 1 micrometre and not more than 150 peaks having a height comprised between 0.4 and 1 micrometre, per square millimetre.

The peak height distribution mentioned above for defining the surface topography of the polyester film base, can be determined, in a known manner, and in particular through visual inspection with an interferential microscope which makes it possible to count the number of interference rings for a light having a known wavelength. The interferometers most frequently used are the NOMARSKI, the MIRAU and the MICHELSON interferometers.

Concerning the industrial implementation of these processes for the preparation of films according to the invention, in which the speed of the machine in which the films are processed is generally in excess of 100 meters per minute, it is particularly preferable that the face of the film base carrying the layer of polyvinyl alcohol and of the water-dispersible copolyester have no more than an average of 20 peaks having a height equal to or in excess of 1 micrometre and no more than 100 peaks having a height comprised between 0.4 and 1 micrometre, per square millimetre.

The polyvinyl alcohol entering into the composition of the layer of the polyvinyl alcohol and of the water-dispersible copolyester can be any polyvinyl alcohol. In practice, the polyvinyl alcohols generally available commercially have a degree of hydrolysis of about 73% to more than 99% (which means that they have a content of from about 73% to more than 99% of vinyl alcohol residues in their formula). Except when stated otherwise, this does not exclude the use of polyvinyl alcohols with a degree of hydrolysis lesser than 73%, when available. In the present description the terms <<degree of hydrolysis>>, <<degree of saponification>> and <<content in vinyl alcohol residues>> are interchangeable.

The water-dispersible copolyesters with sulphonyloxy residues combined with the polyvinyl alcohol in the coating are copolyesters derived from at least one aromatic dicarboxylic acid and from at least one aliphatic diol, and carrying a plurality of sulphonyloxy groups of the general formula (I):

$$—(—SO_3—)_nM \quad (I)$$

in which n is equal to 1 or 2, M is a hydrogen atom, an alkali metal, an earth-alkali metal, a cationic ammonium or a cationic quaternary ammonium.

The term <<water-dispersible copolyester>> designates in the present application copolyesters which are soluble in water or copolyesters forming stable homogeneous dispersions.

The water-dispersible copolyesters carrying sulphonyloxy residues are already known, in particular from patent FR 1 602 002 and from patent EP-A-0 540 374, to which one can refer for more detailed information on their preparation and their composition. They are obtained through the polycondensation of one or of several aromatic dicarboxylic acids with one or several aliphatic diols and at least one difunctional compound including at least one sulphonyloxy group of formula (I). For convenience sake, in the remainder of the specification, the term <<sulphonyloxy group>> designates both hydroxysulphonyl groups and alkali metal salts, alkaline-earth metal salts or ammonium salts derived therefrom.

Amongst the aromatic dicarboxylic acids used for preparing the water-dispersible copolyesters, one can mention, by way of example, terephthalic acid, isophthalic acid, orthophthalic acid and naphthalene 1,4-dicarboxylic acid. These acids can be used alone or as mixtures. Amongst the above-mentioned acids, one can use preferably, for the preparation of water-dispersible copolyesters entering into the composition of the films of the invention, terephthalic acid or isophthalic acid alone, mixtures thereof, or their mixtures with other aromatic dicarboxylic acids. Mixtures of terephthalic acid with one or several other aromatic dicarboxylic acids and specially with isophthalic acid, are particularly well-suited. In this case, the amount of terephthalic acid, expressed in moles, can vary between 20 and 99% of the total number of moles of non sulphonated diacids and, preferably, between 30 and 95%.

Concerning the preparation of the water-dispersible copolyester, aliphatic dicarboxylic acids including 3 to 15 atoms of carbon can be associated with the aromatic diacids. More particularly, a portion or the totality of the aromatic dicarboxylic acid used with the terephthalic acid, such as isophthalic acid, can be replaced by one or several aliphatic acids such as adipic acid, glutaric acid, succinic acid, suberic acid, sebacic acid and dodecanoic acid.

As examples of diols entering into the composition of the water-dispersible copolyesters with sulphonyloxy groups, one can mention ethylene glycol, 1,4-butanediol, 1,5-butanediol, 1,3-propanediol, 1,2-propanediol, 2,2-dimethyl-1,3-propanediol (or neopentylglycol), 1,5-pentanediol, 1,6-hexanediol, diethylene glycol, triethylene glycol, tetraethylene glycol and cyclohexane dimethanol. Ethylene glycol and its oligomers are particularly suitable. They can be used either alone or in mixtures thereof and/or with other diols. Preferably, residues derived from ethylene glycol and from its oligomers are present in the water-dispersible copolyesters.

The sulphonyloxy groups of the water-dispersible copolyesters are introduced via a difunctional compound carrying a sulphonyloxy group, capable of reacting with diols during the polycondensation. Examples of such compounds are cited in the patent EP-A 0 540 374. Preferably, the sulphonyloxy residues are derived from salts of alkali metals of aromatic dicarboxylic acids such as sulphoterephthalic acid, sulfoisophthalic acid, sulphophthalic acid, 4-sulphonaphthalene 2,7-dicarboxylic acid, sulpho-4,4'-bis (hydroxycarbonyl)diphenylsulphones, sulphodiphenyidicarboxylic acid, sulpho4,4'-bis(hydroxycarbonyl) diphenylmethane, 5-sulphophenoxyisophthalic acid.

Water-dispersible copolyesters including sodium 5-oxysulphonylisophtalate residues are preferred.

In the water-dispersible copolyesters, the dicarboxylic acid residues with sulphonyloxy groups represent 5–30 moles per 100 moles of the dicarboxylic acid residues and, preferably, 8–15 moles per 100 moles.

The coating of the polyvinyl alcohol and of the water-dispersible copolyester exhibits a weight ratio of the polyvinyl alcohol to the water-dispersible copolyester of 99/1 to 50/50. Preferably, this weight ratio of the polyvinyl alcohol to the water-dispersible copolyester is comprised between 97/3 and 80 120 and, even more preferably between 95/5 and 85/15.

The other face of the composite films according to the invention, the back face thereof, must exhibit slippage characteristics sufficient for enabling an easy handling of the film, in particular when stretching the same on guide rollers and when winding up of the same on uptake rollers.

These slippage characteristics can be brought about in different manners. One of the most usual methods consists in incorporating into the polyester, before its transformation into a film, solid inert fillers. These fillers are generally mineral fillers, such as for example silica, titanium oxide, zirconium oxide, alumina, mixtures of silica and alumina, silicates, calcium carbonate and barium sulphate. These fillers can also be comprised of particles of polymers.

The average diameter in volume of the fillers is generally comprised between 1 and 10 micrometres and, preferably, between 1 and 5 micrometres.

The filler content of the film is usually comprised between 0.02% and 1% weight relative to the weight of the polyester.

An interesting version of the invention consists in having a polyester film base having surface properties, in particular roughness properties, which are different for each one of its two faces. These differing average roughnesses Rz can, for example, be higher than 0.15 micrometres on the back face of the film and be equal to or lesser than 0.40 micrometres on the face of the film base carrying the coating of the polyvinyl alcohol and of the water-dispersible copolyester.

Thus, the polyester film base can be formed of two layers having differing surface properties, in particular differing roughness properties.

Such dissymetrical films can be obtained using a co-extrusion technique of 2 polyesters having differing filler contents and, possibly fillers of differing nature. Advantageously, the polyester used is the same for the two co-extruded layers and the layer which is to receive the coating of polyvinyl alcohol and of the water-dispersible copolyester has a lower filler content. The relative thickness of the 2 polyester layers forming the polyester film base can vary broadly.

Generally, the layer which has the lower filler content and receiving the coating of the polyvinyl alcohol and of the water-dispersible copolyester has a thickness equal to or in excess of 0.5 $\mu$m and, preferably equal to or in excess of 1.0 $\mu$m.

Film bases of polyester exhibiting differing surface properties on each one of the faces and obtained by other means known from prior art are nor excluded from the field of the invention.

One can thus confer, according to patent EP-A-0 378 954 good slippage characteristics to the back face of a film base by depositing on said back face a modified polymer obtained through a radical polymerisation in an aqueous phase of at least one acrylic monomer and of a polyester dispersible in water, derived from at least one aromatic dicarboxylic acid and from at least one aliphatic diol and including a plurality of sulphonyloxy groups, in particular of sodium sulphonate groups.

Depending on the coating process used, the coating of the polyvinyl alcohol and of the water-dispersible copolyester has a thickness equal to or lesser than 3 μm. This thickness can be, if desired, equal to or lesser than 0.60 μm or even lesser than 0.20 μm, should one wish to facilitate the recycling of the film according to the invention. In practice however, only on rare occasions will the thickness be lesser than 0.05 μm.

An advantageous version of the composite films of the invention is concerned with films which carry a layer of polyvinyl alcohol on top of the coating of the polyvinyl alcohol and of the water-dispersible copolyester. This additional layer makes it possible to further decrease the permeability to gases of the composite films. By way of example, it can generally have a thickness of 0.1 μm to 10 μm.

The films of the invention carry a metal layer on the free face of the coating of the polyvinyl alcohol and of the water-dispersible copolyester or, on the free face of the additional layer of polyvinyl alcohol when such a layer is provided.

The metal layer which is deposited on the surface of the coating of the polyvinyl alcohol and of the water-dispersible polyester which is not in contact with the polyester film or which is deposited on the free face of the additional layer of the polyvinyl alcohol is made of a metal which can be deposited using different known techniques. The metal is selected most often from aluminium, copper, chromium, nickel and silver. For practical and economical reasons, the metal used is preferably aluminium.

The thickness of the metal layer is generally between 0.01 μm and 0.06 μm. This thickness is determined by the measure of the optical density (measurements carried out with an apparatus MACBETH-TD102). These thicknesses correspond to optical densities of 1 to 3.6.

On the free face of the polyester film base, one can also apply a heat-sealable layer which can be of the polyolefin type (such as: radical polyethylenes, linear polyethylenes, metallocene polyethylenes, polypropylenes, ethylene—vinyl acetate copolymers, ionomer resins) and/or copolyesters. These complex films can be obtained by lamination using a single or a two component adhesive or by extrusion coating, by co-extrusion or by spread coating. This heat-sealable layer can function only as a sealable layer or have the double function of a sealable and of a peelable layer.

The complex films thus construed can be used for making packaging items, such as bags, membrane seals for trays, and secondary wrapping designed for packaging products sensitive to oxidation. They are particularly well adapted to packaging under a modified atmosphere.

The present invention is also concerned with a process for the production of the above-described filmy.

More particularly, it concerns a process for the production of metallized composite films based on a polyester film which includes on one of its faces a coating of a polyvinyl alcohol and of a water-dispersible polyester, possibly an additional layer of polyvinyl alcohol, and a metal layer, said process being characterised in that the polyester film base is coated on one of its faces with an aqueous solution including a polyvinyl alcohol having, in a 4% aqueous solution and at 20° C., a viscosity which is equal to or in excess of 4 mPa.s and a water-dispersible copolyester, the coating of the polyvinyl alcohol and of the water-dispersible polyester being in turn coated, if desired, with an aqueous solution of a polyvinyl alcohol, and in that said coated film is subjected to a thermal treatment at a temperature equal to or in excess of 170° C. and in that a metal layer is deposited on the coating of the polyvinyl alcohol and of the water-soluble copolyester or, on the additional layer of polyvinyl alcohol when such a layer is provided, The thickness of the coating of the polyvinyl alcohol and of the water-dispersible polyester is preferably equal to or lesser than 3 micrometres.

The thickness of the additional layer of polyvinyl alcohol is, preferably, from 0.1 to 10 micrometres.

When it is desired to produce a coating of a polyvinyl alcohol and of a water-dispersible ester which has a thickness lesser than 0.6 micrometres, it is preferable that the face of the polyester film on which is applied the solution of the polyvinyl alcohol and of the water-dispersible copolyester to produce a coating exhibits an average surface roughness Rz lesser than or equal to 0.40 μm and includes on the average not more than 20 peaks having a height equal to or in excess of 1 micro-metre and not more than 150 peaks having a height comprised between 0.4 and 1 micrometre per square millimetre.

The coating of the polyester film base by the aqueous solution of the polyvinyl alcohol and of the water-dispersible copolyester can be carried out on-line or as a separate operation. When the coating operation is carried out on-line, the thickness of the coating is lesser and it is preferable to have a film surface topography which is more strictly defined.

In such a case, when the process according to the invention is implemented, for example in an industrial production using a high-speed equipment (generally running at more than 100 metres per minute), it is advantageous that the coating by the aqueous solution of the polyvinyl alcohol and of the water-dispersible copolyester be carried out on a face of the polyester film carrying, on the average, not more than 20 peaks having a height equal to or in excess of 1 micrometre and not more than 100 peaks having a height comprised between 0.4 and 1 micrometre, per square millimetre.

When one carries out a coating operation as a separate step, the polyester film surface can be rougher than in the case of the on-line coating, without this however being a necessity.

Before the coating operation of the film base, the surface thereof is generally subjected to a physical treatment (such as a corona, flame or plasma treatment) designed for ensuring a good spreading of the polyvinyl alcohol layer on said film base. This treatment makes it possible to achieve a value for the surface tension of the film stretched monoaxially which is in excess of that of the coating of the polyvinyl alcohol and of the water-dispersible copolyester and which is preferably equal to or in excess of 54 mN.m.

The aqueous solution of the polyvinyl alcohol and of the water-dispersible copolyester used has generally a concentration of 1% to 20% in weight/weight and, preferably of 5% to 15% in weight/weight. Generally, in the first instance, a solution of polyvinyl alcohol is prepared. This solution is prepared carefully first at room temperature by simply stirring, then by heating to a temperature not exceeding 95° C.; after cooling, the solution is filtered. This solution must be gel-free. The absence of gel must be controlled by turbidity, dry matter content and refractive index measurements. The water-dispersible copolyester is dissolved or dispersed in this solution of polyvinyl alcohol.

The weight ratio of the polyvinyl alcohol to the water dispersible copolyester in said aqueous solution is from 99/1 to 50/50 and ranges preferably from 97/3 to 80/20 and even more preferably from 95/5 to 85/15.

The polyvinyl alcohol used in the process according to the invention is a compound available commercially. It can be used as such or prepared in particular by hydrolysis of vinyl carboxylates, more particularly vinyl polyacetates or their copolymers rich in vinyl acetate residues, such as the copolymers of vinyl acetate and ethylene (or EVA). As was mentioned previously, the polyvinyl alcohol used includes a percentage of vinyl alcohol residues which is not critical. By way of example, one can however indicate a degree of hydrolysis of the polyvinyl alcohol generally from 73 to 99%.

The polyvinyl alcohol used for the preparation of the composite coating of the polyvinyl alcohol and of the water-dispersible copolyester of the composite film of the invention exhibits a viscosity in a 4% aqueous solution and at 20° C., measured in an apparatus of the Brookfield type, which is equal to or in excess of 4 centipoises (or 4 mPa.s), which corresponds, within experimental errors, to an average polymerisation degree in number equal to or in excess of 350.

The choice of the concentration of the solution of the polyvinyl alcohol and of the water-dispersible copolyester, as well as the apparatus used for the coating, is in particular, dependent on the desired thickness for the final coating of the polyvinyl alcohol and of the water-dispersible copolyester.

Coating operations are usually carried out with gravure rollers according to the reverse gravure technique. However, the process of the invention is not limited to this embodiment.

In the case of an on-line coating, the polyester film base is, the more often, stretched longitudinally (i.e. in the machine direction) before said coating by means of an aqueous solution of the polyvinyl alcohol and of the water-dispersible copolymer, without this version limiting the invention.

This stretching can be carried out in one or in several steps, which is also the case of the stretching which follows the coating.

The temperature at which the coated film is treated is preferably between 180° C. and 240° C. or, even more preferably, between 200° C. and 230° C.

The polyester film base can be prepared by extrusion of a polyester such as defined above, including one or several inert fillers to provide, in particular, sufficient slippage characteristics. It can also be prepared by co-extrusion, on the one hand of a polyester low in filler and, on the other hand, of a filled polyester.

In a second version, the polyester film base comprises a filled rough layer providing said back face and a less filled layer, providing said front face, which will be coated with the solution of the polyvinyl alcohol and of the water-dispersible copolyester.

The filled polyester layer generally exhibits an average roughness Rz which is equal to or in excess of 0.15 micrometres and, preferably equal to or in excess of 0.30 micrometres, whereas the less filled or non filled front layer exhibits a total roughness equal to or lesser than 0.40 micrometres and preferably, equal to or lesser than 0.25 micrometres; as indicated previously, the face of the film base, which will be coated with the solution of the polyvinyl alcohol an of the water-dispersible copolyester, carries preferably, on the average, not more than 20 peaks having a height equal to or in excess of 1 micrometre and not more than 100 peaks having a height comprised between 0.4 and 1 micrometre per square millimetre.

The deposition of the metal coating is carried out by any known means. Preferably, use is made of a vacuum metallization technique.

The composite films of the invention exhibit excellent properties of resistance against mechanical aggression, such as in particular, crumpling or folding. This means that the barrier properties already discussed are little or not diminished after such a mechanical aggression.

The following examples illustrate the invention

EXAMPLES

GENERAL EXPERIMENTAL PROCEDURE

A composite film is prepared from polyethylene terephthalate (PET) through the co-extrusion on the one hand of a PET containing 0.7% silica obtained by precipitation of gels and exhibiting an average diameter of 3.3 micrometres (size measurements carried out with a laser sizer <<SYMPATEC>> of the <<Helos>> type) which is the more filled film (back part of the composite film support) and, on the other hand, of a PET with a lower filler content (0.025% of the same silica) of which the outer face will receive a coating of a polyvinyl alcohol (PVA)/water-dispersible copolyester (COPO).

The polyester film has a thickness of 12 micrometres in the different examples or comparative tests and an average roughness Rz of 0.45 on the back face. It has a less filled layer (receiving the coating of the PVA and of the water-dispersible copolymer) which has a thickness of 11.2 micrometres.

The co-extruded film is first stretched longitudinally with a stretch ratio of 3.4; then the same is subjected to a corona treatment which adjusts it surface tension to 58 mN.m.

The face of the film with the less filled layer is then coated by means of a gravure coating system using an engraved roller. The speed of the film in the coating operation is of 200 m/min. The on-line coating (OLC) is carried out using an aqueous solution of PVA and of COPO having a 10% concentration, carefully prepared and devoid of gel. The PVA used has 98–99% vinyl alcohol residues and a viscosity of 5.5 mPa.s (measured at 20° C. in a 4% aqueous solution by means of a viscosimeter of the Brookfield LV type. The COPO used is a copolyester of ethylene and diethylene having an average number molecular weight of about 33000 and including terephthalate and isophthalate residues in a ratio of about 80/20 in weight, and 14% in weight of sodium 5-oxysulfonyl-isophthalate based on the total weight of the copolyester.

The coated film is then subjected to a transverse stretching with a stretch ratio of 4 and is then subjected to a thermal treatment at a temperature of 225° C. The thickness of the PVA/COPO layer is given for each example or comparative test.

On the different films dried at 200° C., measurements are made of the permeability to oxygen at 23° C. with 50% relative humidity (O2P in $cm^3/m^2/24$ h) (measurements carried out using an <<OXTRAN >> apparatus, type 300H from the firm MODERN CONTROL INC.).

Examples 1 to 3 and Comparative Examples a to c

These tests are carried out with a composite polyester film of which the face receiving the coating of PVA/COPO exhibits the following peak height distribution, per $mm^2$: 7 peaks of a height> 1 $\mu$m, 49 peaks of a height between 0.4 and 1 $\mu$m. The coating is carried out on-line (OLC) with aqueous solutions of PVA/COPO exhibiting a weight ratio PVA/COPO of 90/10 (degree of saponification of PVA and overall concentration in the solution indicated in the table hereafter). O2P was measured on the non metallized films (naked films: comparative tests a, b and c).

On one part of these films, an aluminium layer of 0.035 μm was deposited and O2P was measured as previously (metallized films).

In table 1 hereafter, the following abbreviations are used, in addition to the abbreviations defined previously:

<<CT>> stands for <<comparative test>>

<<PVA degree>> stands for <<degree of saponification of PVA.

<<Concsol w/w>> stands for <<total concentration of the aqueous solution in weight>>

<<Thick>>stands for <<thickness of the PVA/COPO coating>>

<<naked>> stands for non metallized film and <<Al>> stands for film metallized with aluminium.

TABLE 1

| Test | PVA degree | Concsol w/w | Thick, μm | Film | O2P |
|---|---|---|---|---|---|
| Example 1 | 98% | 12% | 0.1 | Al | 0.1 |
| Example 2 | 88% | 12% | 0.1 | Al | 0.3 |
| Example 3 | 80% | 12% | 0.1 | Al | 0.2 |
| CT a | 98% | 12% | 0.1 | naked | 2.0 |
| CT b | 88% | 12% | 0.1 | naked | 73 |
| CT c | 80% | 12% | 0.1 | naked | >100 |

Example 4 and Comparative Test d

The same polyester composite film was used in these tests as in examples 1 to 3. In these tests, an on-line coating was carried out using an aqueous solution of PVA/COPO (example 4) or an aqueous solution of PVA only (comparative test e), with a total concentration of 12% in the solution. The weight ratio of PVA/COPO was of 90/10 and the PVA had a saponification degree of 98%.

These films were metallized by deposition of an aluminum layer of 0.035 μm.

The O2P of the metallized films was measured under the conditions indicated for the preceding examples.

Each one of the two metallized films was laminated with a polyethylene film (of 50 μm) using a polyurethane adhesive and an adhesion test was carried out.

This test consists in applying on the film a pulling force with an INSTRON 1122 apparatus, at the speed of 100 mm/min. The peeling strength thus measured is expressed in grams per 15 millimetres. A peeling strength of 150 g 1/5 mm is considered as satisfactory for commercially sold metallized films. The results of these tests are given in table 2 hereafter.

TABLE 2

| Test | PVA/COPO | O2P | Peeling strength, g/15 mm |
|---|---|---|---|
| Example 4 | 90/10 | 0.1 | 220 |
| Comparative example d | 100/0 | 0.1 | 105 |

What is claimed is:

1. A composite metallized film stretched biaxially, based on a polyester and having improved barrier properties to gases, characterised in that it comprises a polyester film base of 5 μm to 50 μm, directly coated on one of its two faces with a layer including a mixture of a polyvinyl alcohol which has an average degree of polymerisation in number equal to or in excess of 350 and a water-dispersible copolyester with sulphonyloxy residues, the layer including the polyvinyl alcohol and the water-dispersible copolyester being in turn coated with a metal layer, said composite film exhibiting a permeability to oxygen measured at 23° C. under a relative humidity of 50% equal to or lesser than 0.4 $cm^3/m^2/24$ h.

2. A film to claim 1, characterised in that the polyster is selected from polyterephthalates or from polynaphthalane dicarboxylates of alkylene diols.

3. A film according to claim 2, characterized in that the polyester is selected from polyterephthalates of ethylene glycol or of 1,4-butanediol or from copolyesters including at least 80% in moles of ethylene glycol terephthalate residues.

4. A film according to claim 1, characterised in that the average roughness Rz of the film base is lesser than or equal to 0.40 μm on the face of the film carrying the layer of the polyvinyl alcohol and of the water-dispersible copolyester and this face exhibits, on the average, not more than 20 peaks having a height equal to or in excess of 1 μm and not more than 150 peaks having a height comprised between 0.4 and 1 micrometre, per square millimetre, and the thickness of the layer including the polyvinyl alcohol and the water-soluble copolyester with sulphonyloxy residues is lesser than 0.6 μm.

5. A film according to claim 1, characterised in that the face of the film base carrying the layer of the polyvinyl alcohol and of the water-dispersible copolyester has, on the average, not more than 20 peaks having a height equal to or in excess of 1 micrometre and no more than 100 peaks having a height comprised between 0.4 and 1 micrometre, per square millimetre.

6. A film according to claim 1, characterised in that the water-dispersible copolyesters with sulphonyloxy residues combined with the polyvinyl alcohol in the coating is selected from copolyesters derived from at least one aromatic dicarboxylic acid and from at least one aliphatic diol, and carrying a plurality of sulphonyloxy groups of the general formula (I):

$$-(-SO_3-)_nM \qquad (I)$$

in which n is equal to 1 or 2, M is a hydrogen atom, an alkali metal, an earth-alkali metal, a cationic ammonium or a cationic quaternary ammonium.

7. A film according to claim 6, characterised in that the aromatic dicarboxylic acid used for preparing the water-dispersible copolyester is selected from terephthalic acid, isophthalic acid, orthophthalic acid, naphthalene 1,4-dicarboxylic acid and their mixtures.

8. A film according to claim 7, characterised in that the aromatic dicarboxylic acid is selected from mixtures of terephthalic acid with one or several other aromatic dicarboxylic acids.

9. A film according to claim 8, characterised in that the aromatic dicarboxylic acid is selected from mixtures of terephthalic acid with isophthalic acid.

10. A film according to claim 7, characterised in that the amount of terephthalic acid expressed in moles is in the range from 20 to 99% of the total number of moles of non sulphonated diacids and in that the water-dispersible copolyester includes sodium 5-oxysulphonyl-isophthalate residues.

11. A film according to claim 10, characterised in that the amount of terephthalic acid expressed in moles is in the range from 30 to 95% of the total number of moles of non sulphonated diacid.

12. A film according to claim 6, characterised in that the diol entering into the composition of the water-dispersible copolyesters with sulphonyloxy groups, is selected from ethylene glycol, 1,4-butanediol, 1,5-butanediol, 1,3-propanediol, 1,2-propanediol, 2,2-dimethyl-1,3-propanediol (or neopentylglycol), 1,5-pentanediol, 1,6-hexanediol, diethylene glycol, triethylene glycol, tetraethylene glycol and cyclohexane dimethanol.

13. A film according to claim 12, characterised in that the diol entering into the composition of the water-dispersible copolyester with sulphonyloxy groups, is selected from ethylene glycol and its oligomers.

14. A film according to claim 6, characterised in that in the water-dispersible copolyester, the dicarboxylic acid residues with sulphonyloxy groups amount to 5–30 moles for 100 moles of the dicarboxylic acid residues.

15. A film according to claim 14, characterised in that in the water-dispersible copolyester, the dicarboxylic acid residues with sulphonyloxy groups amount to 8–15 moles for 100 moles of the dicarboxylic acid residues.

16. A film according to claim 1, characterised in that the coating of the polyvinyl alcohol and of the water-dispersible copolyester exhibits a weight ratio of the polyvinyl alcohol to the water-dispersible polyester of 99/1 to 50/50.

17. A film according to claim 16, characterised in that the coating of the polyvinyl alcohol and of the water-dispersible copolyester exhibits a weight ratio of the polyvinyl alcohol to the water-dispersible copolyester comprised between 97/3 and 80/20.

18. A film according to claim 1, characterised in that the coating of the polyvinyl alcohol and of the water-dispersible copolyester has a thickness equal to or lesser than 3 $\mu$m.

19. A film according to claim 1, characterized in that said composite film further includes a layer of polyvinyl alcohol disposed on top of the coating of the polyvinyl alcohol and of the water-dispersible copolyester, but beneath the metal layer.

20. A film according to claim 19, characterized in that the metal layer, which is deposited on the surface of the polyvinyl alcohol layer is made of a metal selected from aluminum, copper, chrominum, nickel, and silver.

21. A film according to claim 20, characterized in that the metal layer, which is deposited on the surface of the polyvinyl alcohol layer is made of aluminum.

22. A film according to claim 1, characterized in that the metal layer, which is deposited on the surface of the coating of the polyvinyl alcohol and of the water-dispersible polyester not in contact with the polyester film, is made of a metal selected from aluminum, copper, chromium, nickel and silver.

23. A film according to claim 1, characterized in that the metal layer, which is deposited on the surface of the coating of the polyvinyl alcohol and of the water-dispersible polyester not in contact with the polyester film, is made of aluminum.

24. A film according to claim 1, characterised in that the thickness of the metal layer is in the range from 0.01 $\mu$m to 0.06 $\mu$m.

25. A film according to claim 1, characterised in that the polyester base film is comprised of two layers exhibiting different roughnesses Rz.

26. A film according to claim 25, characterised in that the dissymetric polyester film base is produced with a technique of co-extrusion of 2 polyesters having different filler contents and possibly including fillers of differing nature.

27. A film according to claim 26, characterised in that the polyester used is the same for the two co-extruded layers and in that the layer receiving the polyvinyl alcohol layer is the less filled one.

28. A process for the production of metallized composite films according to claim 1, characterised in that the polyester film base is coated on one of its faces with an aqueous solution including a polyvinyl alcohol having, in a 4% aqueous solution and at 20° C., a viscosity which is equal to or in excess of 4 mPa.s and a water-dispersible copolyester, the coating of the polyvinyl alcohol and of the water-dispersible polyester being in turn coated, if desired, with an aqueous solution of a polyvinyl alcohol, and in that said coated film is subjected to a thermal treatment at a temperature equal to or in excess of 170° C. and in that a metal layer is deposited on the coating of the polyvinyl alcohol and of the water-soluble copolyester or, on the additional layer of polyvinyl alcohol when such a layer is provided.

29. A process according to claim 28, characterised in that the face of the polyester film carrying the coating of the polyvinyl alcohol and of the water-dispersible copolyester exhibits an average roughness Rz lesser than or equal to 0.40 $\mu$m and carries, on the average, not more than 20 peaks having a height equal to or in excess of 1 micrometre, and not more than 150 peaks having a height comprised between 0.4 and 1 micrometre per square millimetre, when the desired thickness of the coating including the polyvinyl alcohol and the water-dispersible copolyester is lesser than 0.6 micrometres.

30. A process according to claim 28, characterised in that the coating of the polyester film base with an aqueous solution of the polyvinyl alcohol and of the water-dispersible copolyester is carried out on line or as a separate operation.

31. A process according to claim 30, characterised in that the coating is carried out on-line.

32. A process according to claim 28, characterised in that the aqueous solution of the polyvinyl alcohol and of the water-dispersible copolyester is used at a concentration in the range from 1% to 20% in weight/weight.

33. A process according to claim 32, characterised in that the aqueous solution of the polyvinyl alcohol and of the water-dispersible copolyester is used at a concentration in the range from 5% to 15% in weight/weight.

34. A process according to claim 28, characterised in that the weight ratio of the polyvinyl alcohol to the water-dispersible copolyester in the aqueous solution is between 99/1 and 50/50.

35. A process according to claim 34, characterised in that the weight ratio of the polyvinyl alcohol to the water dispersible copolyester in the aqueous solution is between 97/3 and 80/20.

36. A process according to claim 28, characterised in that the temperature at which the coated film is treated, is between 180° C. and 240° C.

37. A process according to claim 36, characterised in that the temperature at which the coated film is treated, is between 200° C. and 230° C.

* * * * *

UNITED STATES PATENT AND TRADEMARK OFFICE

CERTIFICATE OF CORRECTION

PATENT NO. : 6,436,544 B1 Page 1 of 1
DATED : August 20, 2002
INVENTOR(S) : Veyrat et al.

It is certified that error appears in the above-identified patent and that said Letters Patent is hereby corrected as shown below:

Title page,
Item [86], PCT No. Priority Document: Wo 99/03918 "JP98/04380" should be -- EP98/04380 --

Column 4,
Line 19, "80 120" should be -- 80/20 --
Line 66, "nor" should be -- not --

Column 5,
Line 61, "filmy" should be -- films --

Column 7,
Line 66, "an" should be -- and --

Column 9,
Lines 53-54, "150 g 1/5mm" should be -- 150 g/15mm --

Signed and Sealed this

Eleventh Day of February, 2003

JAMES E. ROGAN
*Director of the United States Patent and Trademark Office*